Jan. 20, 1970     I. A. SPEELMAN     3,490,725

THERMOMETER HOLDER

Filed Jan. 26, 1968

INVENTOR.
IRVING A. SPEELMAN

BY

Blum, Moscovitz, Friedman, Blum & Kaplan
ATTORNEYS

United States Patent Office 3,490,725
Patented Jan. 20, 1970

3,490,725
THERMOMETER HOLDER
Irving A. Speelman, Roslyn Heights, N.Y., assignor to Propper Manufacturing Co., Inc., Long Island City, N.Y., a corporation of New York
Filed Jan. 26, 1968, Ser. No. 700,841
Int. Cl. A47g *29/08;* A47k *1/09;* A47f *5/00*
U.S. Cl. 248—311                        7 Claims

ABSTRACT OF THE DISCLOSURE

A thermometer holder incorporating means for removably supporting a thermometer case in upright position and means for removably supporting a cap when disconnected from the case and including at least one surface through which the holder may be securely but removably affixed to a surface such as the surface of a wall, bedside table, bedpost or the like.

BACKGROUND OF THE INVENTION

To eliminate the need for central sterilization of thermometers, to simplify hospital procedures and reduce the likelihood of transfer of germs between patients, a practice has been developing of issuing a personal thermometer to each patient which may be kept at the patient's bedside for the exclusive use of the patient during his hospital stay. If the thermometer is provided with a protective carrying case, the patient may take the thermometer with him when discharged from the hospital and a new patient will receive a new, presterilized thermometer. This completely eliminates the need for carrying thermometers back and forth from patient to a central sterilization station and also eliminates the possible transfer of germs between patients as a result of incomplete sterilization of a thermometer.

Thermometers that can be left at the patients bedside are known in the art but, since it is desirable to have the thermometer remain in a sterilizing solution at the bedside, the prior art arrangements have the disadvantage of possible loss of the thermometer case and/or cap, both of which are required, as a practical matter, for the patient to take the thermometer with him when he leaves the hospital.

SUMMARY OF THE INVENTION

Generally speaking, in accordance with the invention, a holder is provided which may be securely mounted at bedside which will hold both the thermometer case and the cap when removed from the case while permitting the thermometer to remain in a sterilizing solution to thereby substantially eliminate the likelihood of loss of the case and cap so that the case and cap may be available to house the thermometer when taken home by the patient. With the holder, the thermometer remains at bedside throughout the patient's stay and thus becomes his personal thermometer. The holder may be inexpensively fabricated and removable mounted at bedside so that the holder can be economically replaced if reuse is not desired.

Accordingly, it is an object of this invention to provide an improved thermometer holder capable of supporting both a thermometer case and the cap for the case.

Another object of the invention is to provide an improved thermometer holder which may be inexpensively fabricated and securely but removably mounted to substantially any surface normally found in the area of a hospital bed.

A further object of the invention is to provide an improved thermometer holder which will support a thermometer case in upright position so that the case may receive a thermometer and sterilizing solution for the thermometer.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWING

For a fuller understanding of the invention, reference is had to the following description taken in connection with the accompanying drawing, in which.

DESCRIPTION OF THE PREFERRED EMBODIMENT

Figure 1:
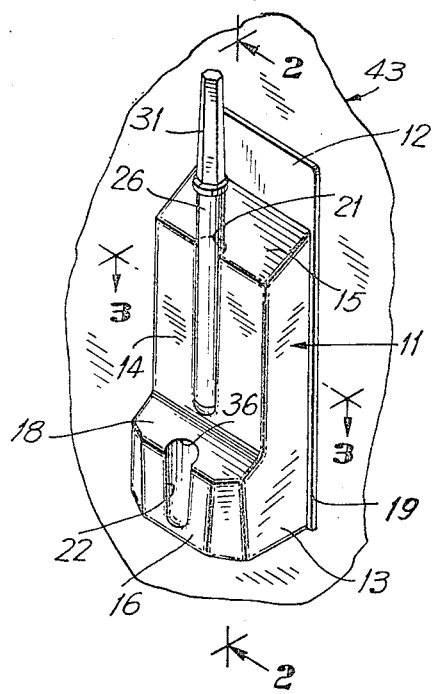
FIG. 1 is a perspective view of a thermometer holder constructed in accordance with a preferred embodiment of the instant invention.

Referring now to FIGS. 1 through 4, a thermometer holder indicated generally at 11 may be vacuum formed of thin plastic material as an inexpensive means of fabrication. The vacuum formed thermometer holder is generall hollow and has a flat back portion 12, substantially vertical side walls 13, a flat upper front face 14, a sloping top wall 15, a generally flat lower front face 16, a flat bottom wall 17 and a sloping intermediate wall 18 extending between the lower edge of upper front face 14 and lower front face 16. Back portion 12 may include a lip 19 extending outwardly from side walls 13.

An elongated, vertically oriented groove 21 is formed in upper front face 14. Groove 21 is closed at its lower end and extends through top wall 15. The groove preferably tapers inwardly from its entry through the top wall to its closed bottom end.

A second elongated, vertically oriented groove 22 is formed in lower front face 16. Groove 22 has a closed lower end and opens upwardly through intermediate wall 18. Groove 22 may also taper inwardly from its open upper end to its closed lower end.

Holder 11 is adapted to receive and support a case and cap for a thermometer. The thermometer case 26 is a tubular unit having a closed lower end 27, a shoulder 28 and a neck 29. A tubular cap 31 having a closed end 32 overfits with neck 29 to provide a closed casing for the usual type of oral or rectal thermometer 33. The case and cap may be of any desired configuration and may be tapered and the cap may threadedly engage the neck of the case.

Case 26 is slidably received in groove 21 and supported therein. Groove 21 is defined by a wall 35 which generally conforms to the outside surface of case 26 with the opening of groove 21 through upper front face 14 being narrower than the outside dimension of the case so that the case is retained within groove 21.

Groove 22 is defined by a wall 36 which generally conforms to the outside surface of cap 31 with the opening of groove 22 through lower front face 16 also being sufficiently narrow to retain cap 31 therein.

Pressure sensitive adhesive material 41 is affixed to the rear surface of back portion 12 and to the outside surface of bottom wall 17 and, prior to use of the holder, each of the adhesives is covered by a release paper 42.

In use, the holder must be generally vertically oriented and securely mounted to a surface. The surface can be the vertical surface of a wall, bedpost, beside table or the like or the horizontal surface of a bedside table or the like. If the surface to which the holder is to be mounted is vertical, the adhesive material on back portion 12 will be utilized as shown in the drawing wherein a vertical wall is indicated at 43. To mount holder 11 to vertical wall 43, the release paper 42 covering the adhesive 41 on back portion 12 is removed and the pressure sensitive adhesive is pressed against the wall for securely supporting the holder on the wall. If the holder is to be mounted on a horizontal surface, the release paper covering the adhesive on bottom wall 17 is removed and the pressure sensitive adhesive on the bottom wall secures the holder on the horizontal surface. While the pressure sensitive adhesive will securely support the holder on a vertical or horizontal surface, the holder can be readily removed by stripping it from the surface to which it is mounted.

Figure 2:
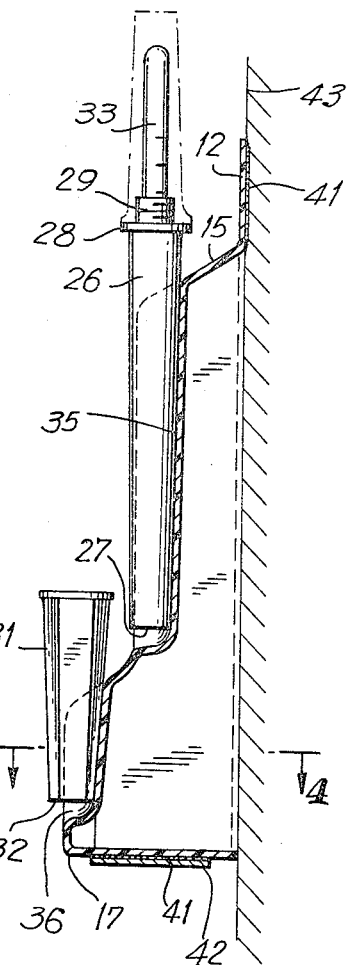
FIG. 2 is a sectional view, at an enlarged scale, taken along line 2—2 of FIG. 1.
Figure 3:
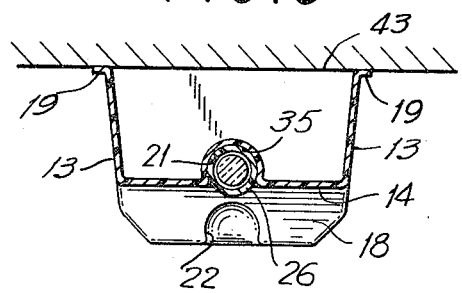
FIG. 3 is a sectional view, at an enlarged scale, taken along line 3—3 of FIG. 1.
Figure 4:
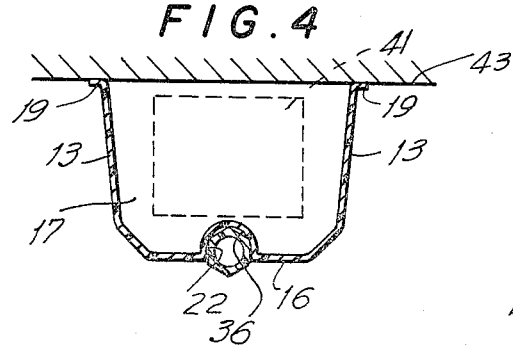
FIG. 4 is a sectional view taken long line 4—4 of FIG. 2.

With the holder affixed to a surface, groove 21 will be generally vertically oriented and a thermometer case mounted in groove 21 will be vertically supported as shown in FIGS. 1 and 2. A quantity of sterilizing solution is placed in the thermometer case which is water tight due to lower end 27 being completely closed. Thermometer 33 is placed in the case with its tip end in the sterilizing solution. With the thermometer in the case, cap 31 may be placed on the case as shown in solid lines in FIG. 1 and in phantom lines in FIG. 2. However, to use the thermometer, cap 31 must be removed and since the cap may remain off the case during the patients stay, the cap is inserted in groove 22 to prevent loss or misplacement thereof. The full line position shown in FIG. 2 shows the thermometer received in the case which is filled with a sterilizing solution, ready for use and the cap mounted where it will not be lost.

By means of the device described above, it is seen that the thermometer may be kept at bedside and become the personal thermometer of the patient, during his stay at the hospital. When he leaves, he merely withdraws case 26 from groove 21, discards the solution, withdraws cap 31 from groove 22 and secures the cap on the case to provide a carrying case for the thermometer which, without the case, would be easily damaged and rendered unserviceable.

For a new patient, it is merely necessary to provide a new thermometer, case and cap which can be mounted in the same holder or, if desired, the holder can be easily replaced.

The holder is shown as being vacuum formed of plastic material since such fabrication results in a relatively inexpensive holder. However, it will be understood that the holder need not be hollow, be vacuum formed, or be fabricated of plastic material. The invention contemplates the provision of a holder having means for supporting the case in a generally upright position, means for supporting a cap and means for mounting the holder on another surface.

It will thus be seen that the objects set forth above, among those made apparent from the preceding description, are efficiently attained and, since certain changes may be made in the above construction without departing from the spirit and scope of the invention, it is intended that all matter contained in the above described or shown in the accompanying drawing shall be interpreted as illustrative and not in a limiting sense.

What is claimed is:

1. A device for retaining a thermometer case and cap comprising a support structure having at least one generally flat surface through which said support structure is supported on the surface of another object, first means for removably receiving a thermometer case and holding said case in a generally upright position, whereby sterilizing solution may be placed in said case, and second means for removably receiving a thermometer case cap and holding said cap when said cap is removed from said case, said first means comprising a case support having an opening through which said case may pass and a wall extending more than 180° around said case and generally conforming to the outer surface of said case, said second means comprising a cap support having an opening through which said cap may pass and a wall at least partially surrounding said cap and generally conforming to the outer surface of said cap.

2. A device as claimed in claim 1, wherein said wall of said first means defines an elongated groove in said support structure.

3. A device as claimed in claim 3 wherein said groove opens outwardly through an outer surface of said support structure along the longitudinal length of said groove, the width of said opening being less than the width of the thermometer case adapted to be received therein.

4. A device as claimed in claim 1 including adhesive means on said at least one generally flat surface for removably adhering said support structure in supported relationship on the surface of another object.

5. A device as claimed in claim 1 wherein said support structure includes two generally flat surfaces through which said support structure is supported on the surface of another object, one of said generally flat surfaces being generally horizontally oriented and the other of said generally flat surfaces being generally vertically oriented whereby said thermometer case can be held in a generally upright position by said first means when said surface of another object is generally horizontal or generally vertical.

6. A device as claimed in claim 5 and including adhesive means for said generally flat surfaces for removably securing said support structure to said surface of another object.

7. A device for retaining a thermometer case and cap comprising a thin walled support structure having a generally flat bottom surface, a generally flat rear surface portion, a first wall defining a first elongated groove having a generally vertical longitudinal axis, said first wall of said first groove generally conforming to the outer surface of a thermometer case and extending more than 180° around said case and a second wall defining a second groove, said second wall of said second groove generally conforming to the outer surface of a thermometer case cap and extending more than 180° around said cap whereby a thermometer case may be removably supported in a generally vertical position in said first groove and a thermometer case cap may be removably supported in said second groove.

References Cited

UNITED STATES PATENTS

| | | | |
|---|---|---|---|
| 1,955,736 | 4/1934 | Claytor et al. | |
| 2,191,782 | 2/1940 | Valane | 248—311 X |
| 2,576,303 | 11/1951 | Matter | 312—206 |
| 2,943,745 | 7/1960 | Bjornson | 211—75 |
| 3,292,885 | 12/1966 | Stephens et al. | 248—37.3 |
| 3,321,068 | 5/1967 | Beach | 206—16.6 |

FOREIGN PATENTS 277,475    8/1951    Switzerland.

ROY D. FRAZIER, Primary Examiner

J. FRANKLIN FOSS, Assistant Examiner

U.S. Cl. X.R.

211—88; 312—206